Patented Mar. 19, 1935

1,995,179

UNITED STATES PATENT OFFICE 1,995,179

ARTIFICIAL LEATHER

Benjamin Holm, Clifton, N. J., assignor, by mesne assignments, to United States Rubber Company, New York, N. Y., a corporation of New Jersey No Drawing. Application June 13, 1933, Serial No. 675,579

6 Claims. (Cl. 106—23)

This invention relates to artificial leather, and more particularly to artificial leather comprising rubber and fiber.

Artificial leather and various rubber products as substitutes for rubber and leather, especially for shoe soles and the like, have been made by combining rubber and fiber in various proportions and by a number of different methods. The simplest procedure, of course, is to mill the fiber directly into a rubber composition broken down on a mill similarly to the compounding of rubber with the usual compounding ingredients. Other methods have been proposed whereby the fibers are first treated with a rubber solution or an aqueous dispersion of rubber to coat the same with a thin coating of rubber and then this rubberized fiber may be milled into a rubber composition broken down on the mill in the usual manner. Leather fiber, and vegetable and mineral fibers, such as cotton and asbestos respectively, as well as mixtures of fibers, have been combined with rubber to produce various substitutes for leather for outsoles and insoles in shoe manufacture and for manufacture of belts, straps, luggage, gaskets, floor coverings, and the like. None of the compositions of the prior art, however, have provided products having the properties of high-grade sole leather, being markedly inferior thereto and being equivalent at best only to leathers of intermediate and of low quality.

The present invention relates to an improved artificial leather product comprising in combination, rubber and fiber, more particularly for shoe solings, heel bases, top lifts, and the like, and for use in other products where relatively great stiffness, resistance to stretch, low permanent set, and other leather-like qualities are desired. Products of the present invention comprise intimate mixtures approximately equal proportions, by weight, of rubber and fiber, the fiber comprising a mixture of leather with vegetable fiber such as cotton, or of leather with vegetable fiber such as cotton and, in addition mineral fiber, such as asbestos, the proportion of leather fiber to total fiber content being at least one-half, and the proportion of leather fiber to cotton fiber being at least 2:1.

A rubber-fiber product made by milling approximately equal proportions of leather and rubber together has an excellent resistance to abrasion and therefore so far as wear is concerned should be well suited for the manufacture of shoe soling materials. Such a product, however, more nearly resembles rubber than leather both in feel and appearance, and in physical properties, such as high permanent set, and because of this, sole material made from such a mixture, for example, will spread under pressure and curl at the toe in wear. Such material is also known to have poor stitching properties. On the other hand a rubber-fiber product made by milling together equal proportions of cotton fiber and rubber has a desirable low permanent set but at the same time has far too low an abrasion resistance to provide a material at all satisfactory for shoe soling and the like, and is lacking in other leather-like properties.

I have found that the combination of a minor proportion of cotton with a major proportion of leather fiber in the production of a rubber-fiber composition, or the addition of both cotton and asbestos together with leather, produces a material having all of the desirable properties of high-grade sole leather, including high abrasion resistance, high flexing resistance, proper stiffness, low permanent set, good stitching qualities and other desirable properties.

For example, a rubber-fiber mixture of 100 parts rubber to 75 parts leather and 25 parts cotton not only gives the desirable low permanent set and stiffness characteristic of a rubber-cotton compound, but the remarkable fact is that the abrasion resistance is substantially equal to that of a mixure of equal parts of rubber and leather, the substitution of 25 parts of leather in a 100 part rubber—100 part leather compound by 25 parts of cotton failing to reduce the abrasion resistance of the rubber-fibre material. I have found that more than about 30 parts of cotton per 100 parts of rubber will, however, very markedly reduce the abrasion resistance, while 15–30 parts of cotton has no effect on the abrasion resistance in the presence of 60–100 parts of leather to 100 parts of rubber. A mixture of 100 parts rubber with 60 parts leather and 40 parts cotton reduces the abrasion resistance, as compared with a mixture of 100 part rubber and 100 parts leather, by 15–20%, while with 50 parts of leather and 50 parts of cotton to 100 parts of rubber, the abrasion resistance is reduced by two-thirds, when the fibers are mixed into the rubber compound on the mill. Proportions throughout the specification are by weight.

If the rubber-leather-cotton mixture contains in addition a small proportion of asbestos, I have found that the abrasion resistance is still further improved, while the low permanent set imparted to the rubber-fibre material by the addition of the cotton may be retained on such further addition of asbestos. For example, the following composition: rubber 100 parts, leather 60 parts, cotton 25 parts, asbestos 30 parts, has an improved abrasion resistance equal to 120% of that of a mixture of 100 parts rubber and 100 parts leather or of a mixture of 100 parts rubber, 75 parts leather, 25 parts cotton. When asbestos is mixed with the leather and cotton, it is preferred not to add the same in greater proportion than 30% by weight of the rubber since larger amounts have a tendency to result in a heavy hard product having a tendency to chip. The total fiber content (by weight) should be 75-125 parts of fiber per 100 parts of rubber, the addition of more than 125 parts of fiber to 100 parts of rubber resulting in a product which after vulcanization of the rubber is liable to chip upon impact with any hard sharp material. Preferably I utilize 90-115 parts of fibres to 100 parts of rubber. The preferred proportions for the various fibers, as above discussed, are:

Leather _____ 60-100
Cotton _____ 15-30
Asbestos _____ 0-30
per 100 parts of rubber.

The equivalence of the products of the present invention to high grade sole leathers, and their superiority to previously known artificial leathers may be illustrated by the following data, from tests on a "U. S. Rubber Co. abrasion machine", representing the wear resistance of the various products specified, wherein a high grade of sole leather such as that used in manufacturing high-priced shoes is rated at 100%, and inferior grades at a lower figure in proportion to their resistance to wear:

|  | Percent |
|---|---|
| High grade leather ("semi-fine back leather") | 100 |
| Fine first quality leather for custom shoes | 128 |
| No. 2 shoulder leather | 37 |
| Representative commercial artificial leathers | |
| (a) | 76 |
| (b) | 74 |
| (c) | 71 |
| Products of the present invention | |
| Rubber 100, leather 75, cotton 25 | 99 |
| Rubber 100, leather 75, cotton 15, asbestos 20 | 95 |
| Rubber 100, leather 60, cotton 25, asbestos 30 | 111 |

The rubber contains the usual vulcanizing ingredients and after the fiber has been mixed into the rubber by milling, or by any other process, the material is sheeted and vulcanized in the usual manner. The cotton used is preferably linters or shearings, although other forms of cotton may be used. The leather used is fiberized leather such as is produced by disintegrating leather scrap by means of a hammer mill or by beating; or leather "fines". Vegetable-tanned leather is preferred to chrome-tanned leather.

The use of cotton fibres or cotton and asbestos fibres in a compound containing rubber and leather, in the proportions of the present invention, produces an artificial leather outsole which has excellent wearing qualities, and is waterproof, has stitching qualities equal to those of leather, and can be skived, channeled, soled, nailed, cemented, or edge finished as readily as leather.

While the invention has been described more or less in detail, it is not intended thereby to so limit the invention inasmuch as the examples herein set forth are merely illustrative thereof and various modifications may be made without departing from the invention, the scope of which is indicated in the following claims.

Having thus described my invention, what I claim as new and desire to protect by Letters Patent is:

1. An artificial leather comprising an intimate mixture of rubber and fiber in the proportion by weight of 75 to 125 parts of fiber per 100 parts of rubber, the fiber comprising 60-100 parts of leather and 15-30 parts of cotton.

2. An artificial leather comprising an intimate mixture of rubber and fiber in the proportion by weight of 75 to 125 parts of fiber per 100 parts of rubber, the fiber comprising 60-100 parts of leather, 15-30 parts of cotton, and up to 30 parts of asbestos.

3. An artificial leather comprising an intimate mixture of rubber and fiber in the proportion by weight of 90 to 115 parts of fiber per 100 parts of rubber, the fiber comprising 60-100 parts of leather and 15-30 parts of cotton.

4. An artificial leather comprising an intimate mixture of rubber and fiber in the proportion by weight of 90 to 115 parts of fiber per 100 parts of rubber, the fiber comprising 60-100 parts of leather, 15-30 parts of cotton, and up to 30 parts of asbestos.

5. An artificial leather comprising an intimate mixture of rubber and fiber in approximately equal proportions, the fiber comprising leather and cotton, the proportion of leather fiber to cotton fiber being at least 2:1.

6. An artificial leather comprising an intimate mixture of rubber and fiber in approximately equal proportions, the fiber consisting of leather, cotton and asbestos, the proportion of leather fiber to total fiber content being at least one-half and the proportion of leather fiber to cotton fiber being a least 2:1.

BENJAMIN HOLM.